(12) United States Patent
Yan

(10) Patent No.: US 9,623,647 B2
(45) Date of Patent: Apr. 18, 2017

(54) FILM STRIPPING APPARATUS

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: David Yan, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 340 days.

(21) Appl. No.: 14/361,496

(22) PCT Filed: May 23, 2013

(86) PCT No.: PCT/CN2013/076176
§ 371 (c)(1),
(2) Date: May 29, 2014

(87) PCT Pub. No.: WO2014/134878
PCT Pub. Date: Sep. 12, 2014

(65) Prior Publication Data
US 2016/0159068 A1    Jun. 9, 2016

(30) Foreign Application Priority Data

Mar. 7, 2013   (CN) .......................... 2013 1 0072117

(51) Int. Cl.
*B32B 38/10*   (2006.01)
*B65H 41/00*   (2006.01)
(Continued)

(52) U.S. Cl.
CPC ............ *B32B 38/10* (2013.01); *B32B 43/006* (2013.01); *B65H 41/00* (2013.01);
(Continued)

(58) Field of Classification Search
CPC . B32B 38/10; B32B 43/006; Y10T 156/1132; Y10T 156/1174; Y10T 156/1944; Y10T 156/195; Y10T 156/1956
(Continued)

(56) References Cited

U.S. PATENT DOCUMENTS 4,897,148 A  *  1/1990  Orlandi .................. H05K 3/288
                                                         156/510
5,358,591 A  *  10/1994  Candore ............. B29C 63/0013
                                                         156/707
(Continued)

FOREIGN PATENT DOCUMENTS

CN          1980847 A       6/2007
CN        101041282 A       9/2007
(Continued)

OTHER PUBLICATIONS

International Search Report dated Nov. 15, 2013; PCT/CN2013/076176.
(Continued)

*Primary Examiner* — Mark A Osele
*Assistant Examiner* — Nickolas Harm
(74) *Attorney, Agent, or Firm* — Ladas & Parry LLP

(57) ABSTRACT

A film stripping apparatus is provided, belongs to a material film-stripping technical field and can solve the problem that the current film stripping technologies are easy to lead to waste contamination, high cost and limited applicability. The film stripping apparatus includes: at least one film stripping roller of adhesiveness; a feeding mechanism for loading a material from which a film is to be stripped into a feeding side of the film stripping roller; and a driving mechanism for driving the film stripping roller to rotate. The film stripping apparatus is used for stripping off film layers, such as single-sided or double-sided protective films, release films or the like on materials of any raw material, size, thickness and shape, and the film stripping apparatus can be used for optical film materials, printing plates, display panels etc, and is suitable for ultra-thin materials, high precision printing plates and the like precision materials.

18 Claims, 2 Drawing Sheets

(51) Int. Cl.
  *B32B 43/00* (2006.01)
  *G02F 1/13* (2006.01)
  *B32B 37/00* (2006.01)

(52) U.S. Cl.
  CPC ....... *B32B 37/0053* (2013.01); *B32B 2457/20* (2013.01); *G02F 1/1303* (2013.01); *G02F 2202/28* (2013.01); *Y10T 156/1132* (2015.01); *Y10T 156/1174* (2015.01); *Y10T 156/195* (2015.01); *Y10T 156/1944* (2015.01); *Y10T 156/1956* (2015.01)

(58) Field of Classification Search
  USPC .................... 156/707, 715, 758, 759, 760
  See application file for complete search history.

(56) References Cited

U.S. PATENT DOCUMENTS

| | | | | |
|---|---|---|---|---|
| 5,540,809 | A * | 7/1996 | Ida | B29C 63/0013 156/715 |
| 5,853,519 | A * | 12/1998 | Watanabe | B32B 38/10 156/247 |
| 6,500,298 | B1 * | 12/2002 | Wright | B29C 63/0013 156/708 |
| 2008/0011420 | A1 | 1/2008 | Yoshizawa et al. | |
| 2009/0139662 | A1 * | 6/2009 | Nakamura | B32B 43/006 156/764 |
| 2011/0061801 | A1 * | 3/2011 | Kitada | B32B 37/182 156/247 |

FOREIGN PATENT DOCUMENTS

| | | |
|---|---|---|
| CN | 201170824 Y | 12/2008 |
| CN | 101806971 A | 8/2010 |
| CN | 202669128 U | 1/2013 |
| CN | 203305634 U | 11/2013 |
| JP | 2007254030 A | 10/2007 |
| JP | 2008186007 A | 8/2008 |

OTHER PUBLICATIONS

International Preliminary Report on Patentability issued Sep. 8, 2015; PCT/CN2013/076176.
First Chinese Office Action Appln. No. 201310072117.6; Dated Aug. 29, 2014.
Third Chinese Office Action Appln. No. 201310072117.6; Dated Jul. 1, 2015.
Second Chinese Office Action dated Feb. 6, 2015; Appln. No. 201310072117.6.

* cited by examiner

FILM STRIPPING APPARATUS

TECHNICAL FIELD

Embodiments of the present invention relate to a film stripping apparatus.

BACKGROUND

Surfaces of many product materials (for example, a film material, a sheet material etc.) are adhered with a protective film or release film functioning for protection. For example, the light guide plate, the liquid crystal panel and the like of a liquid crystal display apparatus all need many optical film materials (diffusion film, reflecting film, polarization film etc.), and since these optical film materials are easy to be damaged, both sides thereof are adhered with protective films of PE (polyethylene) or PET (Polyethylene Terephthalate) material, and it's obvious that these film layers should be stripped off before use.

As illustrated in FIG. 1, the current method for film stripping is mainly to adhere an adhesive tape 9 at the edge of a film layer 12, then to pull the adhesive tape 9 to strip off the film layer 12; in this method, the adhesive tape 9 has to extend beyond the edge of the film layer 12 so that the film layer 12 can be stripped away conveniently, however, the adhesive layer of such an adhesive tape 9 unavoidably contacts the side 111 of a material 11 from which a film is to be stripped away, thereby causing waste contamination to the material 11 (because a film layer 12 does not extend to the side 111 of the material 11). Therefore, in such a method, a specialized adhesive tape 9 that unlikely causes the waste is used, but due to the higher price of the specialized adhesive tape 9, the manufacturing costs rise.

Besides, in the current technology, there also exists an apparatus for stripping off a film from materials in coil stock form; however, such an apparatus can only be used for coil stocks, that is to say, the apparatus applies only to soft film materials but is not applicable for hard plate materials, thus having restricted applicability; furthermore, even for a film material, if the size thereof is greater (for example, the size thereof is greater than 7 inches), the thickness thereof is generally also greater (in order to avoid damaging the film materials), and therefore, such film materials are difficult to be made into coil stocks because of the limitations of stress and deformability; in addition, the coil stock requires a certain continuity, directionality etc, thus its manufacturing cost, difficulty in the manufacturing techniques (for example, the difficulty of cutting) etc. are also higher than those for a separated sheet stock.

SUMMARY

With regard to the problem that the current film stripping technology is easy to lead to waste contamination, high cost and limited applicability, embodiments of the present invention provide a film stripping apparatus, which has no waste contamination, low cost, and extensive applicability.

The film stripping apparatus provided by the embodiments of the present invention comprises: at least one film stripping roller of adhesiveness; a feeding mechanism for loading a material from which a film is to be stripped into a feeding side of the film stripping roller; and a driving mechanism for driving the film stripping roller to rotate.

In the film stripping apparatus of the embodiments of the present invention, the film stripping roller has adhesiveness so that it can stick onto and strip off the film layer, thus achieving an automatic film stripping process; the feeding mechanism can feed the material accurately, so that the film stripping roller is unlikely to touch the side of the material, thereby the waste contamination is reduced; and in the meantime, the adhesive layer on the film stripping roller is used repeatedly for a long time, the adhesive layer thus can be pressed tightly, and therefore its cost is low and the waste adhesive is unlikely to be produced; in addition, the film stripping process for materials of different raw materials, sizes, thicknesses and shapes can be performed through regulation of the dimension, position and quantity etc. of the film stripping roller so the film stripping apparatus has an extensive applicability.

Preferably, two film stripping rollers are provided, and the axial directions of the two film stripping rollers are parallel to each other, and the two film stripping rollers are provided at an interval; the feeding mechanism is used for loading the material from which a film is to be stripped into a space between the two film stripping rollers; and the driving mechanism is used for driving the two film stripping rollers to rotate in opposite directions.

Preferably, the film stripping apparatus further comprises: an adsorption mechanism provided opposite to the film stripping roller for the absorption of the material during film stripping.

Preferably, the feeding mechanism comprises a feeding roller or a feeding belt for supporting and transporting the material from which a film is to be stripped.

Further preferably, the film stripping apparatus further comprises a positioning mechanism provided at the feeding side of the film stripping roller; and the positioning mechanism comprises a positioning roller provided spaced from the feeding mechanism for pressing the material from which a film is to be stripped against the feeding mechanism.

Further preferably, the positioning mechanism further comprises: a pressure sensor for detecting the pressure on the positioning roller; and a positioning roller regulating device for regulating the distance between the positioning roller and the feeding mechanism according to the detected result from the pressure sensor.

Preferably, the film stripping apparatus further comprises: a cleaning roller provided at the feeding side of the film stripping roller for cleaning the material from which a film is to be stripped.

Preferably, the film stripping apparatus further comprises a charging mechanism for loading the material from which a film is to be stripped into the feeding mechanism; and the charging mechanism comprises: a charging adsorption mechanism for absorbing the material from which a film is to be stripped; a charging movement mechanism for moving the charging adsorption mechanism between the position for storing the material from which a film is to be stripped and the position for the feeding mechanism; and a charging elevation mechanism for lifting the material from which a film is to be stripped and/or lifting the charging adsorption mechanism.

Preferably, the film stripping apparatus further comprises: a waste discharge mechanism provided at an exit side of the film stripping roller for discharging a waste film stripped by the film stripping roller.

Further preferably, the waste discharge mechanism comprises: a robot arm for gripping the waste film stripped by the film stripping roller; and a detector for detecting the position of the waste film stripped by the film stripping roller.

Further preferably, the detector is an optical sensor.

Preferably, the film stripping apparatus further comprises: a film stripping roller regulating device for regulating the position of the film stripping roller.

Preferably, the film stripping roller comprises a roller body and an adhesive layer provided at the surface of the roller body; and the roller body is made of an elastic material.

DETAILED DESCRIPTION

In order to clearly illustrate the technical solution of the embodiments of the invention, the drawings of the embodiments will be briefly described in the following; it is obvious that the described drawings are only related to some embodiments of the invention and thus are not limitative of the invention.

Embodiment 1

Figure 1:
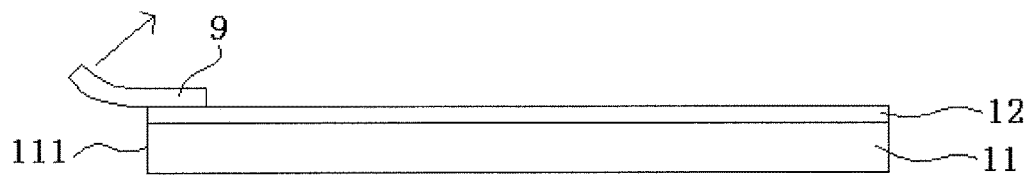
FIG. 1 is a schematic view illustrating the principle of the current process of using an adhesive tape to strip films.
Figure 2:
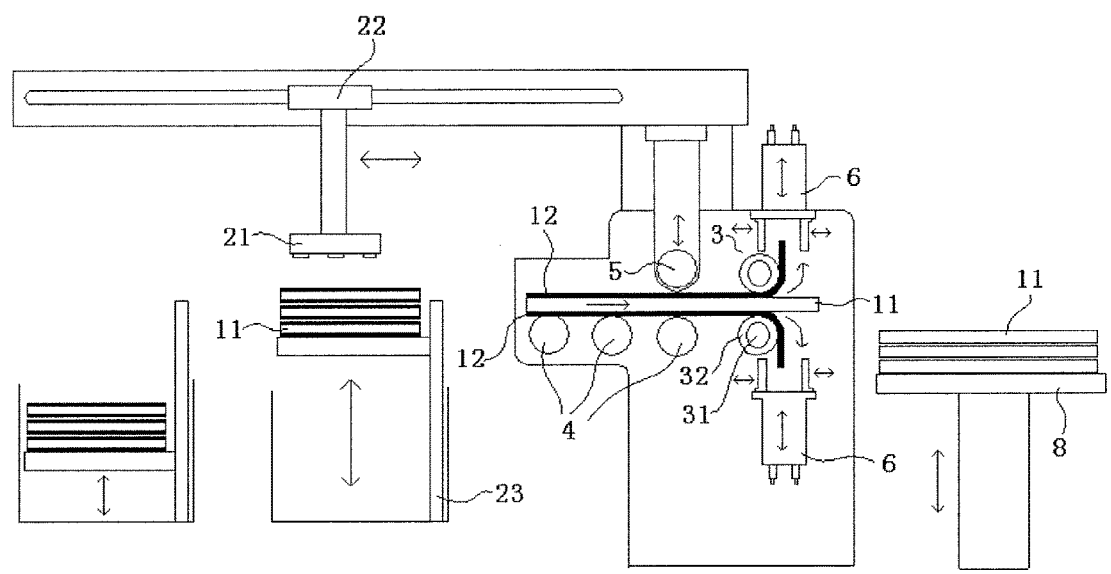
FIG. 2 is a structural schematic view of the film stripping apparatus of a second embodiment of the present invention.

The present embodiment provides a film stripping apparatus, as illustrated in FIG. 2, which comprises two film stripping rollers 3, a feeding mechanism and a driving mechanism (not shown in the drawing).

In the apparatus, the feeding mechanism is used for delivering the material 11 from which a film is stripped away into a space between the two film stripping rollers 3 (that is, the feeding side thereof, the left side in FIG. 2) so as to perform film stripping.

Preferably, the feeding mechanism can comprise a feeding roller 4 or a feeding belt for supporting the material 11 from which a film is to be stripping; and through the rotation of the feeding roller 4 or the feeding belt, the material 11 from which a film is to be stripped can be moved.

Such roller or belt type feeding mechanism is simple in structure, low in costs, and reliable in operation, and applicable for either hard or soft materials 11.

Further preferably, the film stripping apparatus may further comprise a positioning mechanism provided at the feeding side of the film stripping roller 3, and the positioning mechanism comprises a positioning roller 5 spaced from the feeding mechanism (that is, the positioning roller 5 does not contact the feeding mechanism with a certain gap therebetween), the positioning roller 5 is used for pressing the material 11 from which a film is to be stripped on the feeding mechanism (for example, the feeding roller 4), thereby ensuring the material 11 from which a film is to be stripped be fed into the space between the two film stripping rollers 3 more steadily and accurately.

Further preferably, the positioning mechanism may further comprise: a pressure sensor for detecting the pressure against the positioning roller 5 (not shown in the drawing); and a positioning roller regulating device (for example, an air cylinder, an oil cylinder, a guide rail etc, not shown in the drawings) for regulating the distance between the positioning roller 5 and the feeding mechanism according to the detected result from the pressure sensor.

With the pressure sensor and the positioning roller regulating device, the position of the positioning roller 5 can be regulated timely according to the pressure on the positioning roller 5, thus achieving the accurate positioning of different materials 11 (for example, materials 11 of different thicknesses).

Preferably, the film stripping apparatus may further comprise a cleaning roller (not shown in the drawing) provided at the feeding side of the film stripping roller 3 for cleaning the material 11 from which a film is to be stripped.

The cleaning roller can clean the surface of a film layer 12 so as to remove the dust thereon, so that the film layer 12 can be firmly adhered onto the film stripping roller 3 and easy to be stripped off; and in the meantime, it can reduce the dust adhered onto the film stripping roller 3, thus lengthening the lifespan of the film stripping roller 3.

Specifically, the cleaning roller can replace the positioning roller 5, that is, the cleaning roller can be provided at the position of the positioning roller 5; or the cleaning roller can be provided at the front or back side of the positioning roller 5.

Preferably, the film stripping apparatus further comprises a charging mechanism for loading the material 11 from which a film is to be stripped into the feeding mechanism; the charging mechanism comprises: a charging adsorption mechanism 21 for absorbing the material 11 from which a film is to be stripped; a charging movement mechanism 22 (for example, guide rail, chain etc.) for moving the charging adsorption mechanism 21 between the position where the material 11 from which a film is to be stripped is stored and the position for the feeding mechanism; and a charging elevation mechanism 23 (for example, an air cylinder, an oil cylinder, a guide rail etc.) for lifting the material 11 from which a film is to be stripped, and certainly, the charging elevation mechanism 23 can also be used for lifting the charging adsorption mechanism 21, or it can also be used for lifting the material 11 from which a film is to be stripped and the charging adsorption mechanism 21 simultaneously.

When a charging operation is required, the charging adsorption mechanism 21 can move to be above the position where the material 11 from which a film is to be stripped is stored (different materials 11 from which a film is to be stripped can be stored at different positions); the charging elevation mechanism 23 lifts the material 11 (certainly the charging elevation mechanism 23 can also lower the charging adsorption mechanism 21, or move the two simultaneously) to be closer to the charging adsorption mechanism 21; the charging adsorption mechanism 21 absorbs the topmost sheet of material 11, moves to the upward side of the feeding mechanism under the action of the movement mechanism 22, then releases the absorption, and places the material 11 onto the feeding mechanism; and the charging process is completed.

Preferably, there are two film stripping rollers 3, the axial lines of which are parallel to each other, and the two film stripping rollers 3 are spaced from each other (that is, there is a gap between them, no contact occurs). The surfaces of the film stripping rollers 3 has adhesiveness, and can rotate along opposite directions (as shown in FIG. 2, as for the upper film stripping roller 3, in the counter-clockwise direction; and as for the lower film stripping roller 3, in the clockwise direction) when the film stripping rollers 3 are driven by the driving mechanism.

When the material 11 enters the space between the two film stripping rollers 3, the film layers 12 on two sides of the material 11 are stuck by the two film stripping rollers 3 respectively; as the film stripping rollers 3 rotate, the film layers 12 on the two sides are stripped off in opposite directions, and the upward and downward acting forces upon the material 11 applied by the film layers 12 on the two sides are cancelled out by each other, thus the material 11 after the film stripping moves automatically toward the exit side (the right side in FIG. 2) of the film stripping roller 3.

Preferably, the film stripping roller 3 can comprise a roller body 31 and an adhesive layer 32 provided on the surface of the roller body 31; the roller body 31 is made of an elastic material; and the elastic material can be rubber, plastic etc.

The roller body 31 made of an elastic material can produce deformation to a certain extend, so it is not easy for the roller body 31 to damage the material 11, and the roller body 31 has a broader applicability and can be used for the film stripping for a ultra-thin material, high precision printing plate and similar precision materials.

Since the film stripping roller 3 can used repeatedly and differs from an adhesive tape, the adhesive layer 32 thereon can also be pressed tightly, so that it can be used for a long time and is not likely to give rise to waste adhesive; when the adhesive layer 32 reaches its service life, its only required to use alcohol etc. to remove the adhesive layer 32 completely and then form a new adhesive layer 32 on the roller body 31.

Preferably, the film stripping apparatus further comprises a film stripping roller regulating device (for example, an air cylinder, an oil cylinder, a guide rail etc., not shown in the drawings) for regulating the position of the film stripping roller 3.

By providing a film stripping roller regulating device, the distance between the two film stripping rollers 3 can be regulated timely according to the thickness or the like of the materials 11 from which a film is to be stripped, so that the film stripping apparatus has an even broader applicability.

Preferably, the film stripping apparatus further comprises: a waste discharge mechanism provided at the exit side of the film stripping roller 3 for discharging the waste film stripped off by the film stripping roller 3.

With the waste discharge mechanism, the waste film stripped off by the film stripping roller 3 can be discharged timely so as to prevent the waste film from influencing the film stripping.

More preferably, the waste discharge mechanism comprises: a robot arm 6 for gripping the waste film stripped off by the film stripping roller 3; and a detector (not shown in the Figs.) for detecting the position of the waste film.

In the film stripping apparatus of the present embodiment, the stripped waste film is firstly adhered on the film stripping roller 3, so ifs preferable to use a robot arm 6 of very high moving-position accuracy to grip and remove the waste film; and in the meantime, in order to accurately learn when the gripping action should be performed, a detector is used to detect the position of the waste film. In this embodiment, the robot arm 6 can comprise two gripping fingers which are movable to grip the waste film, and after the gripping fingers grip the waste film, the robot arm moves up or down as a whole so as to take away the waste film and drop it into a dump box etc.

Further preferably, the detector is an optical sensor. By the optical sensor, it can be detected accurately whether there exists a waste film on the surface of the film stripping roller 3 (when there exists a waste film, the light-reflective state of the surface of the film stripping roller 3 varies).

Figure 4:
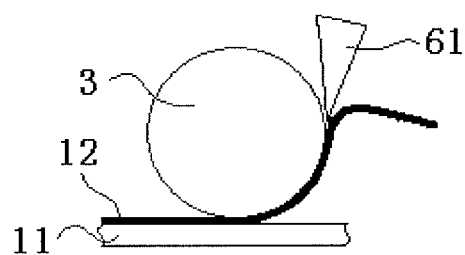
FIG. 4 is a structural schematic view of another waste discharge mechanism in the film stripping apparatus of the second embodiment of the present invention.

Certainly, this detector can also be in other forms, such as a touch sensor (sensing the position by touching the waste film); and the waste discharge mechanism can also be in other forms, for example, the waste discharge mechanism can comprise a stripping blade 61 close to the surface of the film stripping roller 3, and as shown in FIG. 4, the stripping blade 61 can be provided at a position very close to the surface of the film stripping roller 3; and when the surface of the film stripping roller 3 is adhered with a film material, the stripping blade 61 can "shovel" off the waste film adhered onto the surface of the film stripping roller 3 and collect the waste film into the dump box etc.

Certainly, the film stripping apparatus can also comprise a material receiving mechanism 8 for collecting the material 11 after the film stripping; such a material receiving mechanism 8 can be in many forms, such as a discharge basket, a loading platform, and the material receiving mechanism 8 is preferably movable up or down so as to continuously collect a plurality of sheets of materials (as more materials 11 are collected, the total height of the materials 11 is higher, thus the material receiving mechanism 8 descends as the collection proceeds). Certainly, it's also possible to continuously collect the material 11 after the film stripping manually if the material receiving mechanism 8 is not provided.

The driving mechanism is used for driving the two film stripping rollers 3 to rotate in opposite directions, to perform film stripping.

Certainly, the driving mechanism can also be used to drive other moving parts in the film stripping apparatus (for example, the feeding mechanism, the positioning mechanism, the respective regulating devices, the waste discharge mechanism etc.), or other moving parts can also comprise their own driving mechanisms respectively.

Because the driving mechanism, the feeding mechanism, the respective regulating devices (the positioning roller regulating device, the film stripping roller regulating device etc.), the waste discharge mechanism and the like are known and of various forms, detailed description thereof is omitted herein.

Embodiment 2

Figure 3:
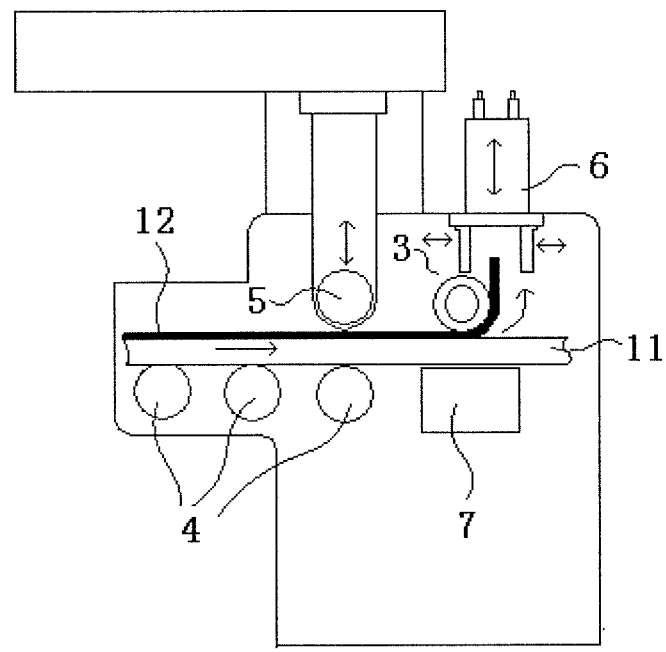
FIG. 3 is a partial structural schematic view of the film stripping apparatus of a third embodiment of the present invention.

The present embodiment provides a film stripping apparatus comprising a similar structure to the film stripping apparatus of embodiment 1, and the difference lies in that: As illustrated in FIG. 3, in the film stripping apparatus of the present embodiment, an adsorption mechanism 7 for absorbing the material 11 subjected to film stripping is disposed opposite to the film stripping roller 3.

Obviously, some of the materials 11 only have the film layer 12 to be stripped on one side, thereby one film stripping roller 3 is sufficient to achieve the film stripping thereof; however, in such a situation, the acting force by the film stripping operation upon the material 11 acts only in one direction, and therefore the adsorption mechanism 7 is needed to be provided opposite to the film stripping roller 3 to prevent the material 11 from deforming or being taken away with the film layer 12 (especially for a soft film material).

Certainly, there are many ways to achieve that the film stripping roller 3 and the adsorption mechanism 7 are provided oppositely; for example, as illustrated in FIG. 3, the film stripping roller 3 below the film stripping apparatus of the embodiment 2 can be directly replaced with the adsorption mechanism 7; or, the film stripping roller 3 and the adsorption mechanism 7 can be both provided in the lower part, and both of them can operate so as to perform a real-time switch between the film stripping roller 3 and the adsorption mechanism 7 according to requirements.

In addition, if film stripping is performed on hard material 11, for example, a plate material, the adsorption mechanism 7 can be omitted, and the shape of the material 11 is kept with the aid of the hardness thereof only.

Certainly, the film stripping apparatus of the above embodiments may further comprise other known structures, for example, a collection mechanism for gathering the material after the film stripping, a frame for connecting respective parts together, a power unit for providing power for the driving mechanism and the moving parts.

The film stripping apparatus of the embodiments of the present invention can be used for stripping off film layers, such as single-sided or double-sided protective films, release films or the like materials of any raw material, size, thickness and shape, and the film stripping apparatus can be used for optical film materials, printing plates, display panels etc, and is suitable for ultra-thin materials, high precision printing plates and the similar precision materials.

It's to be understood that the above embodiments are only exemplary embodiments used for explaining the principle of the present invention; however, the present invention is not limited thereto. The skilled person in this art can made various variations and modifications without departing from the spirit and essence of the present invention, and these variations and modifications are also deemed as falling into the scope of the present invention.

The invention claimed is:

1. A film stripping apparatus, comprising:
   a film stripping roller of adhesiveness;
   a feeding mechanism for loading a material from which a film is to be stripped into a feeding side of the film stripping roller;
   a driving mechanism for driving the film stripping roller to rotate; and
   a cleaning roller provided at the feeding side of the film stripping roller and configured for cleaning the material from which a film is to be stripped.

2. The film stripping apparatus according to claim 1, wherein
   two film stripping rollers are provided, and axial directions of the two film stripping rollers are parallel to each other, and the two film stripping rollers are provided at an interval;
   the feeding mechanism is configured for loading the material from which a film is to be stripped into a space between the two film stripping rollers; and
   the driving mechanism is configured for driving the two film stripping rollers to rotate in opposite directions.

3. The film stripping apparatus according to claim 2, wherein
   the feeding mechanism comprises a feeding roller or a feeding belt configured for supporting and transporting a material from which a film is to be stripped.

4. The film stripping apparatus according to claim 2, further comprising a positioning mechanism provided at the feeding side of the film stripping roller; and
   wherein the positioning mechanism comprises:
   a positioning roller provided spaced from the feeding mechanism and configured for pressing the material from which a film is to be stripped against the feeding mechanism.

5. The film stripping apparatus according to claim 2, further comprising a charging mechanism for loading the material from which a film is to be stripped into the feeding mechanism;
   wherein the loading mechanism comprises:
   a charging adsorption mechanism configured for absorbing the material from which a film is to be stripped;
   a charging movement mechanism configured for moving the charging adsorption mechanism between a position for storing the material from which a film is to be stripped and a position for the feeding mechanism; and
   a charging elevation mechanism configured for lifting the material from which a film is to be stripped and/or lifting the charging adsorption mechanism.

6. The film stripping apparatus according to claim 2, further comprising:
   a waste discharge mechanism provided at an exit side of the film stripping roller and configured for discharging a waste film stripped by the film stripping roller.

7. The film stripping apparatus according to claim 2, further comprising:
   a film stripping roller regulating device configured for regulating a position of the film stripping roller.

8. The film stripping apparatus according to claim 2, wherein
   the film stripping roller comprises a roller body and an adhesive layer provided at a surface of the roller body; and
   the roller body is made of an elastic material.

9. The film stripping apparatus according to claim 1, further comprising:
   an adsorption mechanism provided opposite to the film stripping roller and configured for absorbing a material during film stripping.

10. The film stripping apparatus according to claim 1, wherein
    the feeding mechanism comprises a feeding roller or a feeding belt configured for supporting and transporting a material from which a film is to be stripped.

11. The film stripping apparatus according to claim 1, further comprising a positioning mechanism provided at the feeding side of the film stripping roller; and
    wherein the positioning mechanism comprises:
    a positioning roller provided spaced from the feeding mechanism and configured for pressing the material from which a film is to be stripped against the feeding mechanism.

12. The film stripping apparatus according to claim 11, wherein the positioning mechanism further comprises:
    a pressure sensor configured for detecting a pressure on the positioning roller, and
    a positioning roller regulating device configured for regulating a distance between the positioning roller and the feeding mechanism according to a detected result from the pressure sensor.

13. The film stripping apparatus according to claim 1, further comprising a charging mechanism for loading the material from which a film is to be stripped into the feeding mechanism;
    wherein the loading mechanism comprises:
    a charging adsorption mechanism configured for absorbing the material from which a film is to be stripped;
    a charging movement mechanism configured for moving the charging adsorption mechanism between a position for storing the material from which a film is to be stripped and a position for the feeding mechanism; and a charging elevation mechanism configured for lifting the material from which a film is to be stripped and/or lifting the charging adsorption mechanism.

14. The film stripping apparatus according to claim 1, further comprising:

a waste discharge mechanism provided at an exit side of the film stripping roller and configured for discharging a waste film stripped by the film stripping roller.

15. The film stripping apparatus according to claim 14, wherein the waste discharge mechanism comprises:

a robot arm configured for gripping the waste film stripped by the film stripping roller; and a detector configured for detecting a position of the waste film stripped by the film stripping roller.

16. The film stripping apparatus according to claim 15, wherein the detector comprises an optical sensor.

17. The film stripping apparatus according to claim 1, further comprising:

a film stripping roller regulating device configured for regulating a position of the film stripping roller.

18. The film stripping apparatus according to claim 1, wherein the film stripping roller comprises a roller body and an adhesive layer provided at a surface of the roller body; and the roller body is made of an elastic material.

* * * * *